United States Patent [19]
Kim et al.

[11] Patent Number: 5,699,208
[45] Date of Patent: Dec. 16, 1997

[54] MAGNETIC RECORDING/REPRODUCING APPARATUS DECK MECHANISM WITH COMPONENT OPERATING SLIDE MEMBER BETWEEN MAIN DECK AND SUB-DECK

[75] Inventors: Bong Joo Kim; Kwan Kyu Lee; Un Ju Lee, all of Suwon, Rep. of Korea

[73] Assignee: Samsung Electronics Co., Ltd., Kyungki-do, Rep. of Korea

[21] Appl. No.: 447,875

[22] Filed: May 23, 1995

[30] Foreign Application Priority Data

Sep. 15, 1994 [KR] Rep. of Korea ............... 94-23861
Oct. 8, 1994 [KR] Rep. of Korea ............... 94-25937

[51] Int. Cl.$^6$ .................. G11B 15/61; G11B 15/665
[52] U.S. Cl. ................................. 360/85; 360/95
[58] Field of Search ............ 360/85, 95, 96.1–96.3, 360/96.5

[56] References Cited

U.S. PATENT DOCUMENTS

| | | | |
|---|---|---|---|
| 4,731,684 | 3/1988 | Suzuki | 360/85 |
| 4,930,028 | 5/1990 | Kunimaru et al. | 360/85 |
| 5,172,283 | 12/1992 | Fukuyama et al. | 360/137 |
| 5,218,492 | 6/1993 | Miyamoto et al. | 360/85 |
| 5,291,349 | 3/1994 | Yamaguchi | 360/84 |
| 5,291,351 | 3/1994 | Takita et al. | 360/85 |
| 5,459,626 | 10/1995 | Lee et al. | 360/85 |
| 5,485,324 | 1/1996 | Do et al. | 360/85 |

FOREIGN PATENT DOCUMENTS

| | | |
|---|---|---|
| 0204487 | 12/1986 | European Pat. Off. |
| 0356985 | 3/1990 | European Pat. Off. |
| 0503669 | 9/1992 | European Pat. Off. |
| 2261312 | 5/1993 | United Kingdom |
| 2263809 | 8/1993 | United Kingdom |

*Primary Examiner*—Craig A. Renner
*Attorney, Agent, or Firm*—Sughrue, Mion, Zinn, Macpeak & Seas, PLLC

[57] ABSTRACT

A deck mechanism for a magnetic recording/reproducing apparatus and which includes a main deck where a head drum is installed, and a sub-deck which moves with respect to the main deck and where a reel table is installed. A slide member is provided between the main deck and the sub-deck and moves by a cam gear and selectively operates a pole base, brake and pinch roller.

12 Claims, 14 Drawing Sheets

(A)

(B)

(A)

(B)

(A)

(B)

000
MAGNETIC RECORDING/REPRODUCING APPARATUS DECK MECHANISM WITH COMPONENT OPERATING SLIDE MEMBER BETWEEN MAIN DECK AND SUB-DECK

BACKGROUND OF THE INVENTION

The present invention relates to a deck mechanism of a magnetic recording/reproducing apparatus and, more particularly, to a magnetic recording/reproducing apparatus whose structure is simplified so as to facilitate miniaturization of a manufactured product.

A magnetic recording/reproducing apparatus, for example, a camcorder, has a video tape recorder function and a camera function which are unified. The camcorder comprises a head drum where a magnetic drum is installed in a single deck, a reel table where a reel of a cassette tape is loaded, a tape guide for ejecting a tape from the cassette tape and guiding the tape, and a driver for rotating the reel table. Accordingly, a construction mechanism of a deck is complicated, which makes miniaturization of a product difficult. Recently, a magnetic recording/reproducing apparatus where the above-described elements are divided and installed into a main deck and a sub-deck has been developed.

FIG. 1 is a plan view schematically showing a deck mechanism of a conventional magnetic recording/reproducing apparatus. A head drum 106, a loading motor 101, a cam gear 102 rotated by the driving force of the loading motor 101, and a cam lever 104 interlocked with the cam gear 102 are installed on a main deck 109. A first cam groove 103 and a second cam groove 103a are formed in the cam gear 102. Cam lever 104 is interlocked with the first cam groove 103. Loading grooves 116 and 116a for guiding pole bases 115 and 115a are formed in both sides of head drum 106.

Sub-deck 105 is slidably installed at an upper portion of main deck 109 and moves slidingly up and down by the cam lever 104. A slide member 110 coupled to the second cam groove 103a of the cam gear 102 is installed between the main deck 109 and the sub-deck 105 and is guided by a guide pin 117 installed on the main deck 109. In addition, the pole bases 115 and 115a where a guide pin for guiding a tape is installed and loading arms 107 and 107a connected to the pole bases are rotatably installed on an upper surface of the sub-deck 105, centering around rotating axes 114 and 114a, respectively. In addition, a reel table (not shown) where a tape cassette is loaded is installed on sub-deck 105. The reel table is selectively rotated by a driver (not shown) and is stopped by a brake (not shown). Loading arms 107 and 107a are respectively connected to levers 112 and 112a rotatably installed on slide member 110 by resilient members 111 and 111a. Sliders 108 and 108a of loading arms 107 and 107a slidably contact pins 113 and 113a installed on the levers 112 and 112a, respectively.

The above-described conventional magnetic recording/reproducing apparatus operates as follows. When the driving motor 101 operates, the cam gear 102 rotates via a series of gears. When the cam gear 102 rotates, the sub-deck 105 where a tape cassette (not shown) is loaded moves toward the head drum 106 by the cam lever 104 that rotates in accordance with the first cam groove 103. At the same time, the slide member 110 moves toward the head drum 106 by the rotating cam gear 102. In addition, the loading arms 107 and 107a rotate as the sliding portions 108 and 108a contact the pins 113 and 113a, respectively. Here, guiding members 211 & 212 and 213 & 214 installed in the pole bases 115 and 115a withdraws a tape from a tape cassette. In addition, the pole bases 115 and 115a move along the loading grooves 116 and 116a so that a tape contacts the head drum 106. In such a state, the head drum 106 rotates and the tape travels, to thereby perform a magnetic recording/reproducing operation.

However, the slide member 110 drives only the pole bases 115 and 115a. The reel table stops by a brake. The deck mechanism of the conventional magnetic recording/reproducing apparatus has operators for driving each element and which must be separately installed. Accordingly, the structure is complicated and the production cost is high, which makes product miniaturization difficult.

SUMMARY OF THE INVENTION

Accordingly, it is an object of the present invention to provide a magnetic recording/reproducing apparatus whose structure is simplified so as to facilitate miniaturization of a manufactured product.

To accomplish the above object of the present invention, there is provided a deck mechanism of a magnetic recording/reproducing apparatus, comprising:

a main deck where a head drum with a magnetic head and a capstan motor are installed;

a sub-deck, having disposed thereon a supply reel table and a take-up reel table where a tape cassette is loaded, is slidably installed on an upper portion of the main deck. Also, a brake member for braking at least one of the reel tables, a pair of pole bases for drawing out a tape from the tape cassette and transmitting the tape toward the head drum, a connecting lever and a loading arm connected to the pole bases and rotatably installed, a pinch roller pressed onto a shaft of the capstan motor so as to press and transmit the tape, and a rotatable lever for supporting the pinch roller, are all installed on the sub-deck.

The deck mechanism further comprises moving means for moving the sub-deck with respect to the main deck; and operating means for integrally operating the brake member, pinch roller and pole bases.

In the recording/reproducing apparatus of the present invention, a tape guider and a recording/reproducing element are divided and installed on a main deck and a sub-deck, and a plurality of elements operate by a single member, to thereby simplify the structure. Accordingly, a recording/reproducing apparatus can be miniaturized.

BRIEF DESCRIPTION OF THE DRAWINGS

The above objects and other advantages of the present invention will become more apparent by describing in detail a preferred embodiment thereof with reference to the accompanying drawings, in which.

DETAILED DESCRIPTION OF THE PREFERRED EMBODIMENT

Figure 1:
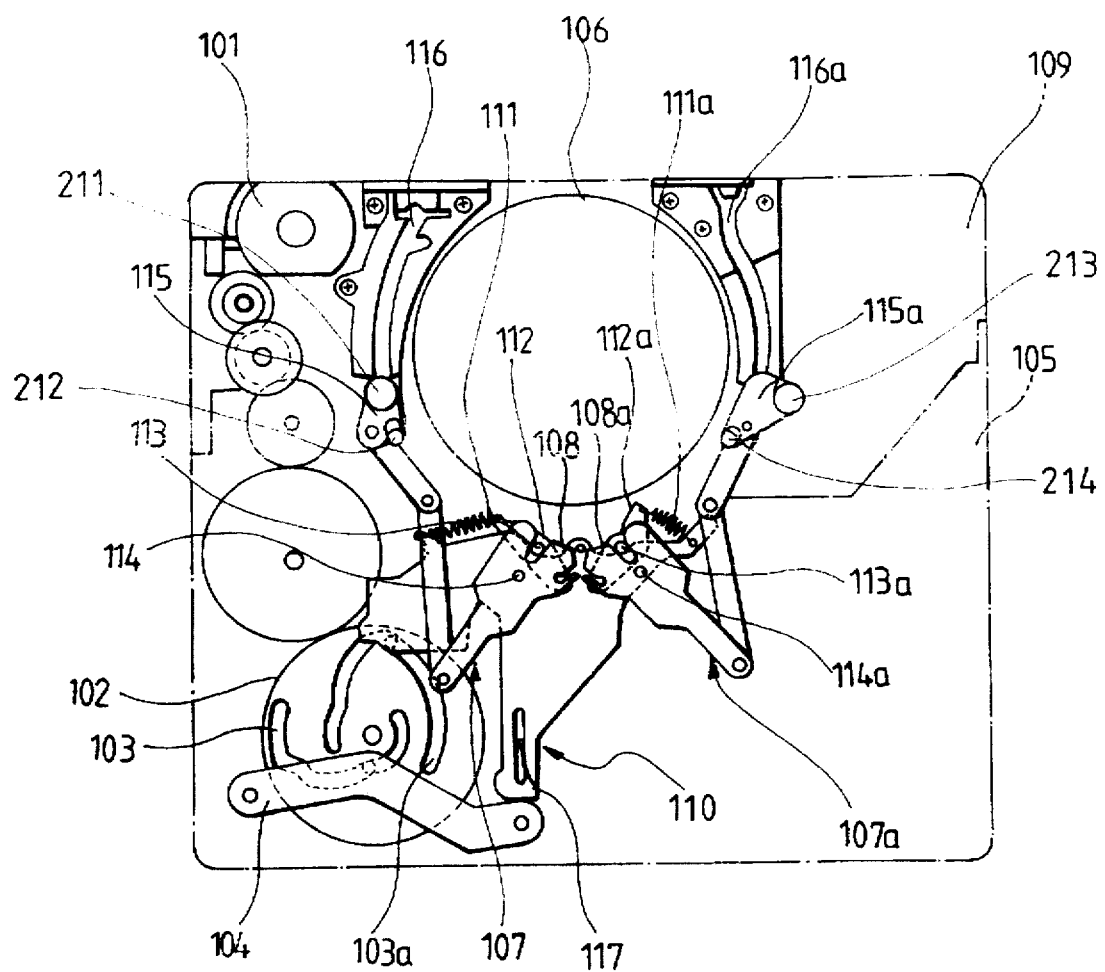
FIG. 1 is a plan view showing a conventional deck mechanism.
Figure 2:
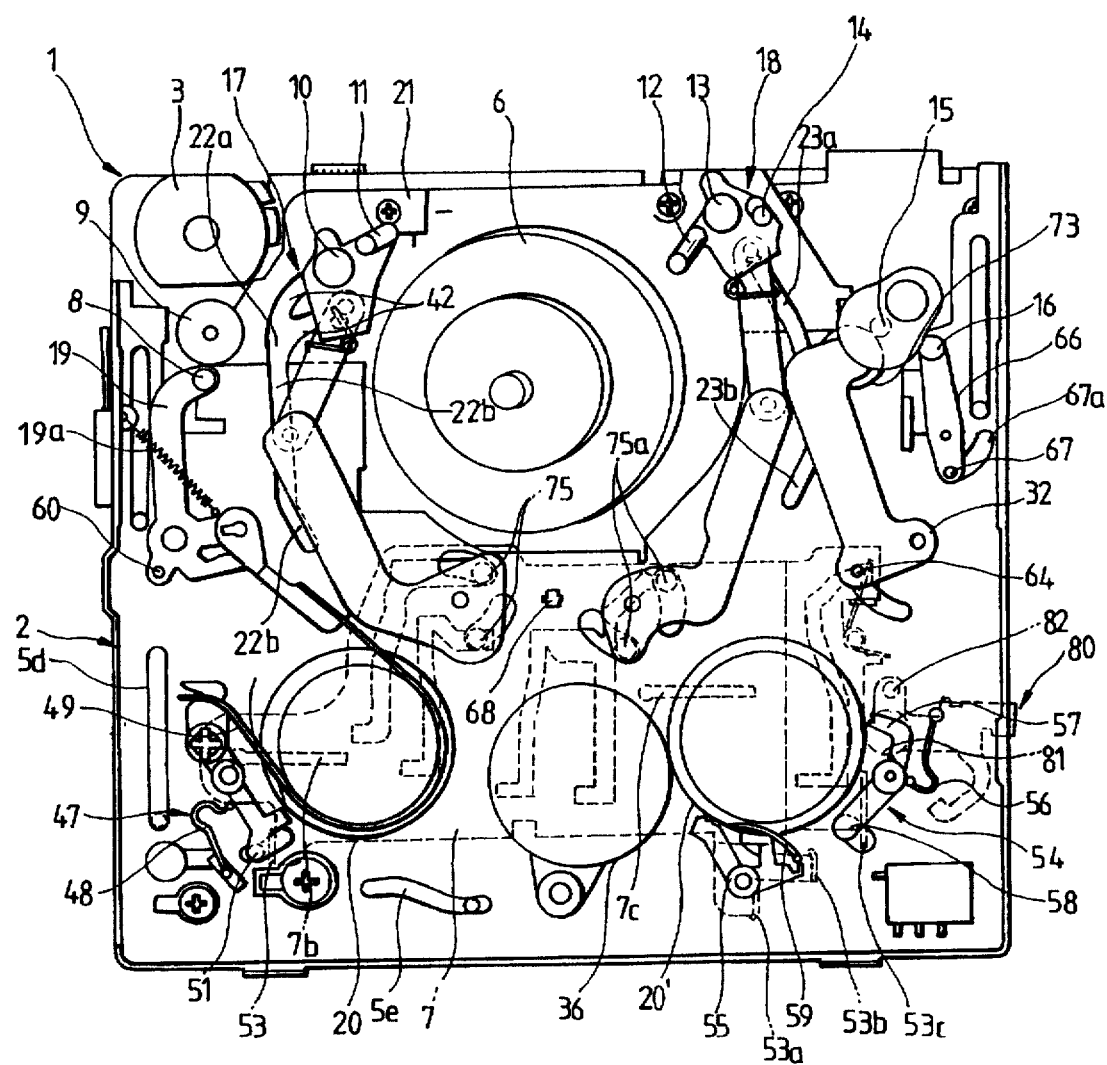
FIG. 2 is a plan view showing a deck mechanism according to the present invention.
Figure 3:
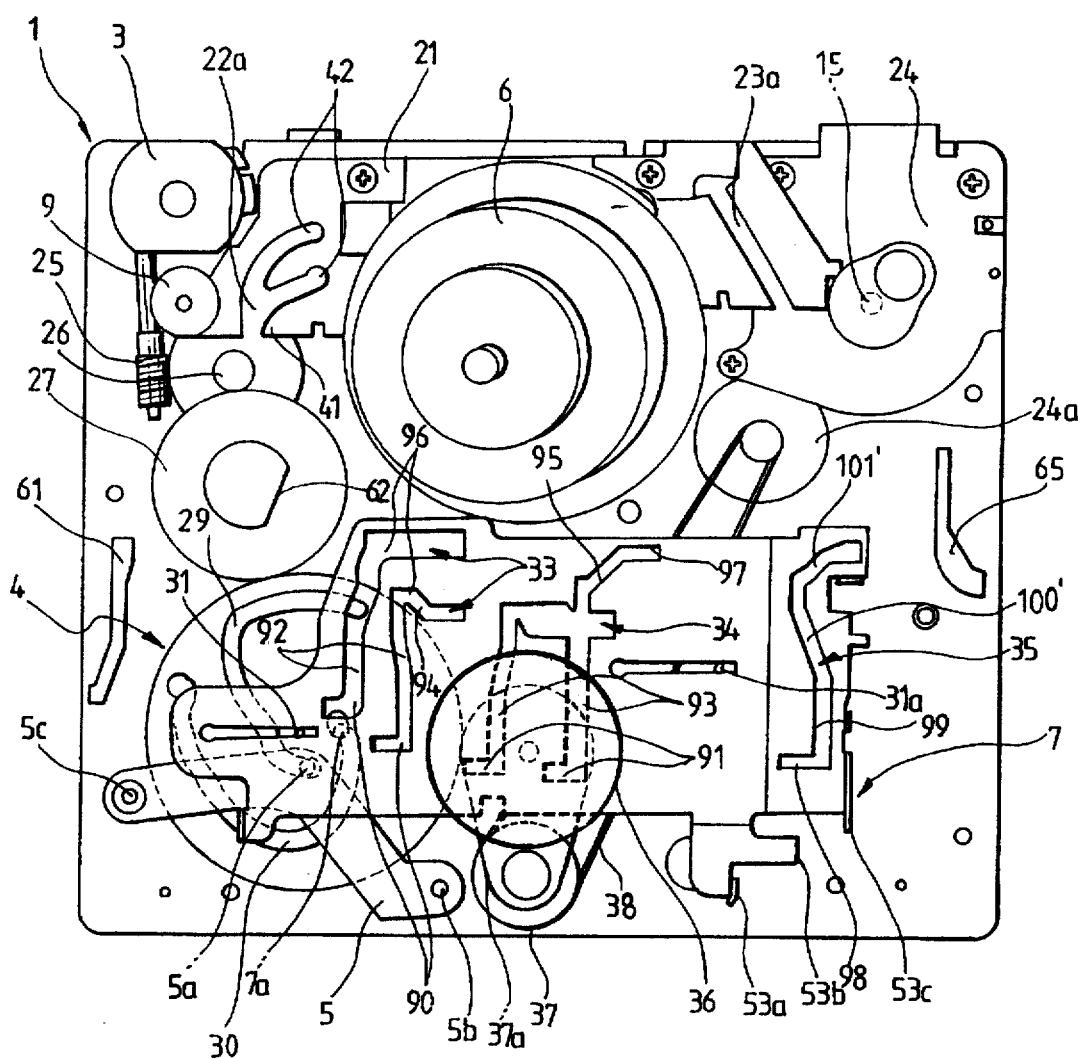
FIG. 3 is a plan view showing a main deck according to the mechanism of the present invention.
Figure 4:
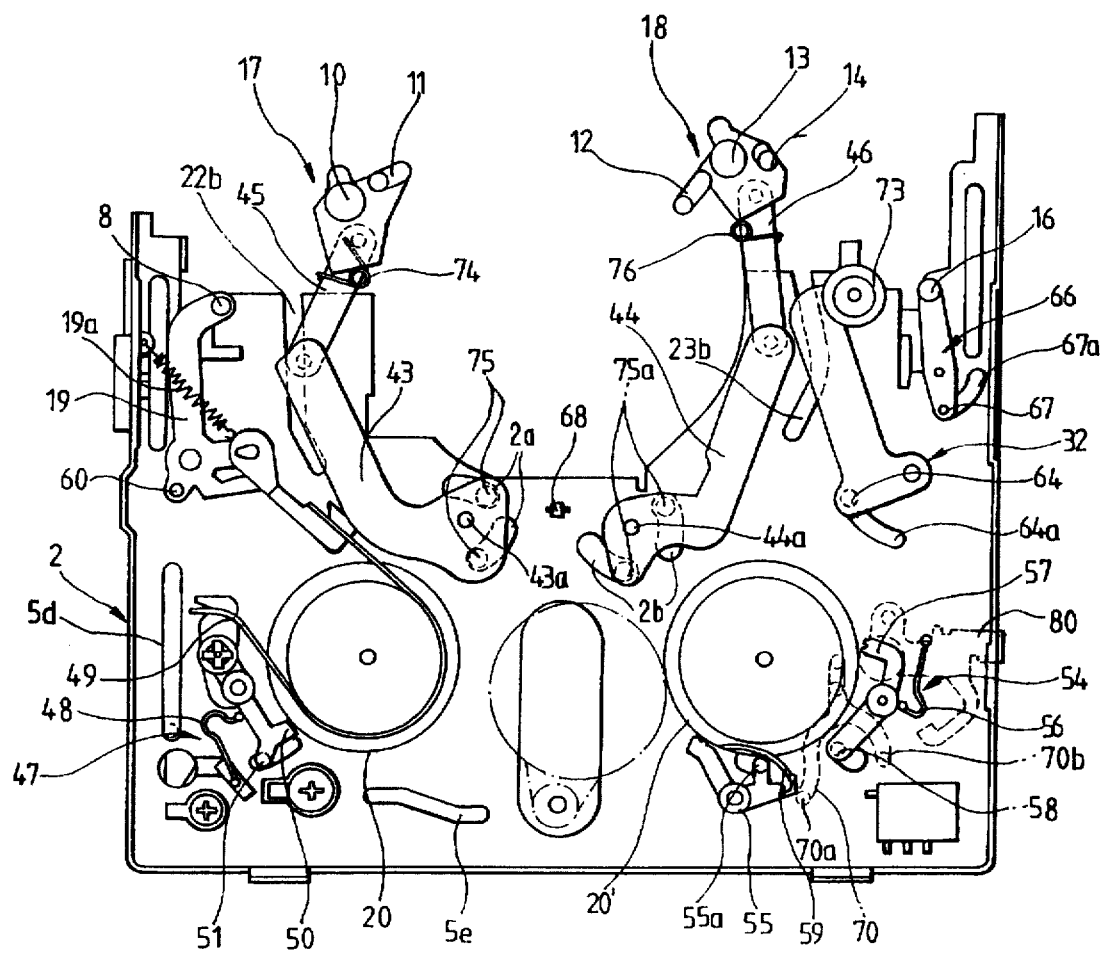
FIG. 4 is a plan view showing a sub-deck according to the mechanism of the present invention.

FIG. 2 is a plan view showing a deck mechanism of the present invention, FIG. 3 is a plan view showing a main deck, and FIG. 4 is a plan view showing a sub-deck. Referring to FIGS. 2 to 5 and 11, a deck mechanism of a recording/reproducing apparatus of the present invention includes a main deck 1 fixed to a body (not shown), and a sub-deck 2 movable by predetermined moving means with respect to main deck 1.

Figure 5:
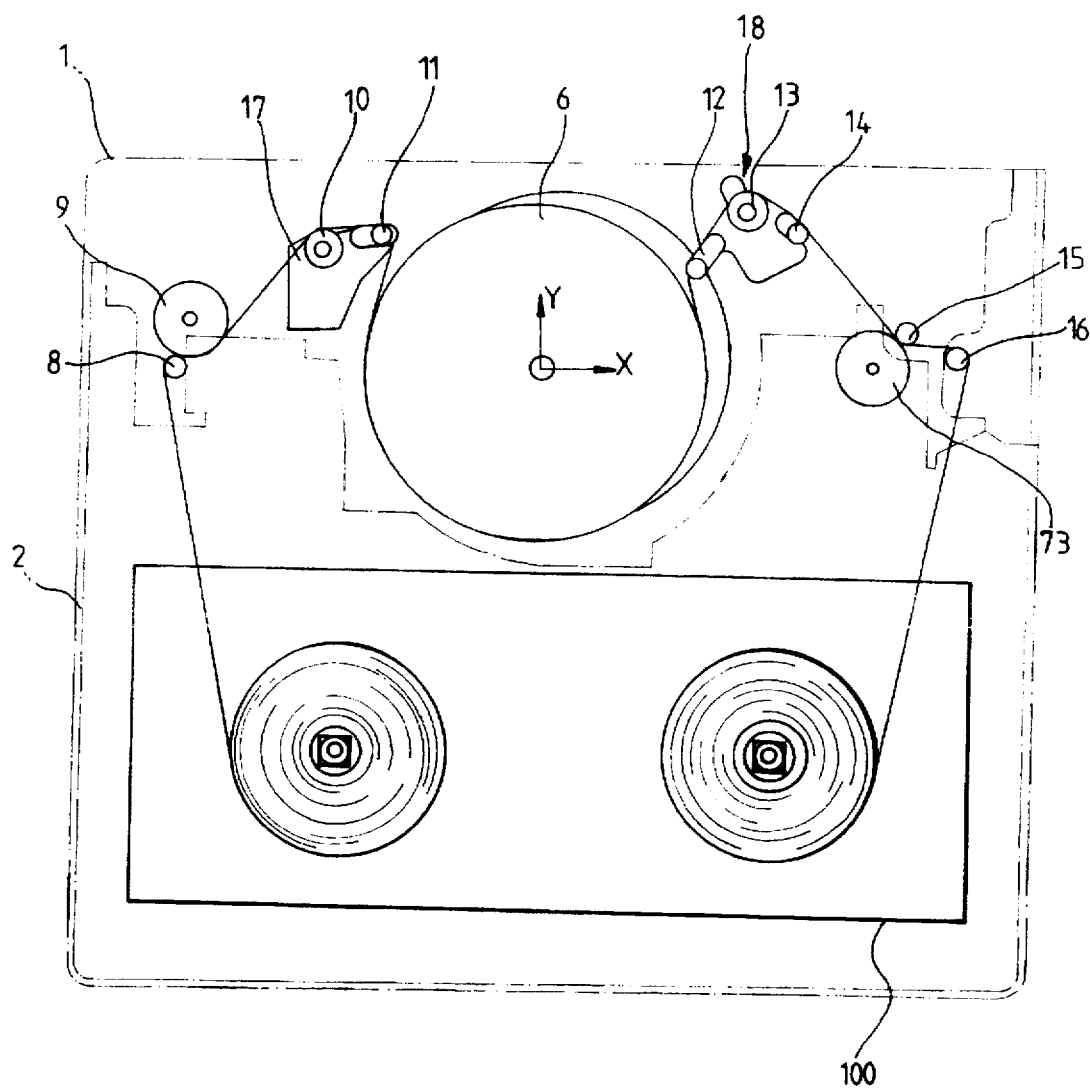
FIG. 5 is a schematic view showing the loaded state of a tape.

A head drum 6 having a magnetic head and a capstan motor 24 are installed on main deck 1. A tape guide roller 9 is positioned to the left side of head drum 6. The capstan motor 24 is installed on a lower portion of main deck 1, and a shaft 15 protrudes upward from main deck 1. As shown in FIG. 5, the head drum 6 is inclined toward the third quadrant.

A supply reel table 20 and a take-up reel table 20', where a tape cassette 100 is loaded, are installed on sub-deck 2. In addition, a sub-brake 47 that frictionally contacts supply reel table 20, a weak brake 55 that frictionally contacts take-up reel table 20', and a main brake 54 for braking take-up reel table 20' are installed sub-deck 2. Sub-brake 47 is rotatably installed on sub-deck 2, includes a friction portion 50 that frictionally contacts an outer circumferential surface of take-up reel table 20 and a protrusion 51 protruding towards main deck 1, and is coupled to a resilient member 48 fixed onto the sub-deck 2. Weak brake 55 is installed rotatably onto sub-deck 2 and includes a resilient member 59 that frictionally contacts an outer circumferential surface of take-up reel table 20' and a protrusion 55a protruding downward from sub-deck 2. In addition, main brake 54 is rotatably installed on sub-deck 2 and comprises a brake 57 that strongly contacts an outer circumferential surface of take-up reel table 20' and a protrusion 58 protruded toward main deck 1. In addition, main brake 54 is coupled to resilient member 56 which is fixed onto sub-deck 2.

A pair of pole bases 17 and 18 for loading a tape from tape cassette 100 onto the head drum 6 are installed on sub-deck 2. A first guide roller 10 and a first inclined pole 11 are installed on the pole base 17, and a second guide roller 13, a second inclined pole 12 and a third inclined pole 14 are installed on the pole base 18. Loading arms 43 and 44 are rotatably installed on sub-deck 2, centering around rotation axes 43a and 44a. Connection levers 45 and 46 are rotatably connected to respective end portions of loading arms 43 and 44. In addition, pole bases 17 and 18 are rotatably connected to respective end portions of connecting levers 45 and 46. Connection levers 45 and 46 and pole bases 17 and 18 are resiliently biased by mutually resilient members 74 and 76. Guide pins 75 and 75a are installed in the bottom surface of loading arms 43 and 44, and guide grooves 2a and 2b for guiding guide pins 75 and 75a are formed in sub-deck 2.

A pinch roller 73 which is pressed onto capstan motor shaft 15 so as to press and transmit a tape is installed on sub-deck 2. The pinch roller 73 is installed on lever 32 which is rotatably installed on sub-deck 2. A guide pin 64 protruded toward main deck 1 is installed on lever 32, and guide groove 64a to which guide pin 64 is coupled is formed in sub-deck 2.

In addition, a tension controller for providing a predetermined tension to a tape in a play mode and review mode is installed on sub-deck 2.

In a play mode, the tension controller comprises a tension arm 19 which is adjacent to the left side of the head drum 6 and rotatably installed on the sub-deck 2, a tension pole 8 installed on the leading end of tension arm 19, and a resilient member 19a for resiliently biasing tension arm 19 in one direction. A band brake member 49 that frictionally contacts an outer circumferential surface of supply reel table 20 is installed on tension arm 19. Meanwhile, a guide pin 60 protruded toward the main deck 1 is installed in one side of the tension arm 19, and a first guide groove 61 to which guide pin 60 is coupled is formed in the main deck 1. Thus, when sub-deck 2 moves up and down, the guide pin 60 moves along in the first guide groove 61. Here, tension arm 19 rotates as tension pole 8 contacts the tape.

In a review mode, the tension controller comprises a review arm 66 which is installed on sub-deck 2 rotatably at the right side of head drum 6, a review pole 16 installed on the leading end of the review arm 66, and a guide pin 67 protruded toward the main deck 1 in the other end of the review arm 66. Guide groove 67a to which guide pin 67 is coupled is formed in sub-deck 2. In the meantime, a second guide groove 65 to which guide pin 67 is coupled is formed in main deck 1. Accordingly, when sub-deck 2 moves up and down, the review arm 66 rotates since guide pin 67 is guided along the second guide groove 65.

Here, the first and second guide grooves 61 and 65 have a predetermined inclined portion or curvature.

In addition, upper loading grooves 22a and 23a to which the pair of pole bases 17 and 18 are guided are formed in drum base 21 and the main deck 1 on both sides of the head drum 6. Lower loading grooves 22b and 23b connected to upper loading grooves 22a and 23a are formed in the sub-deck 2.

Figure 9:
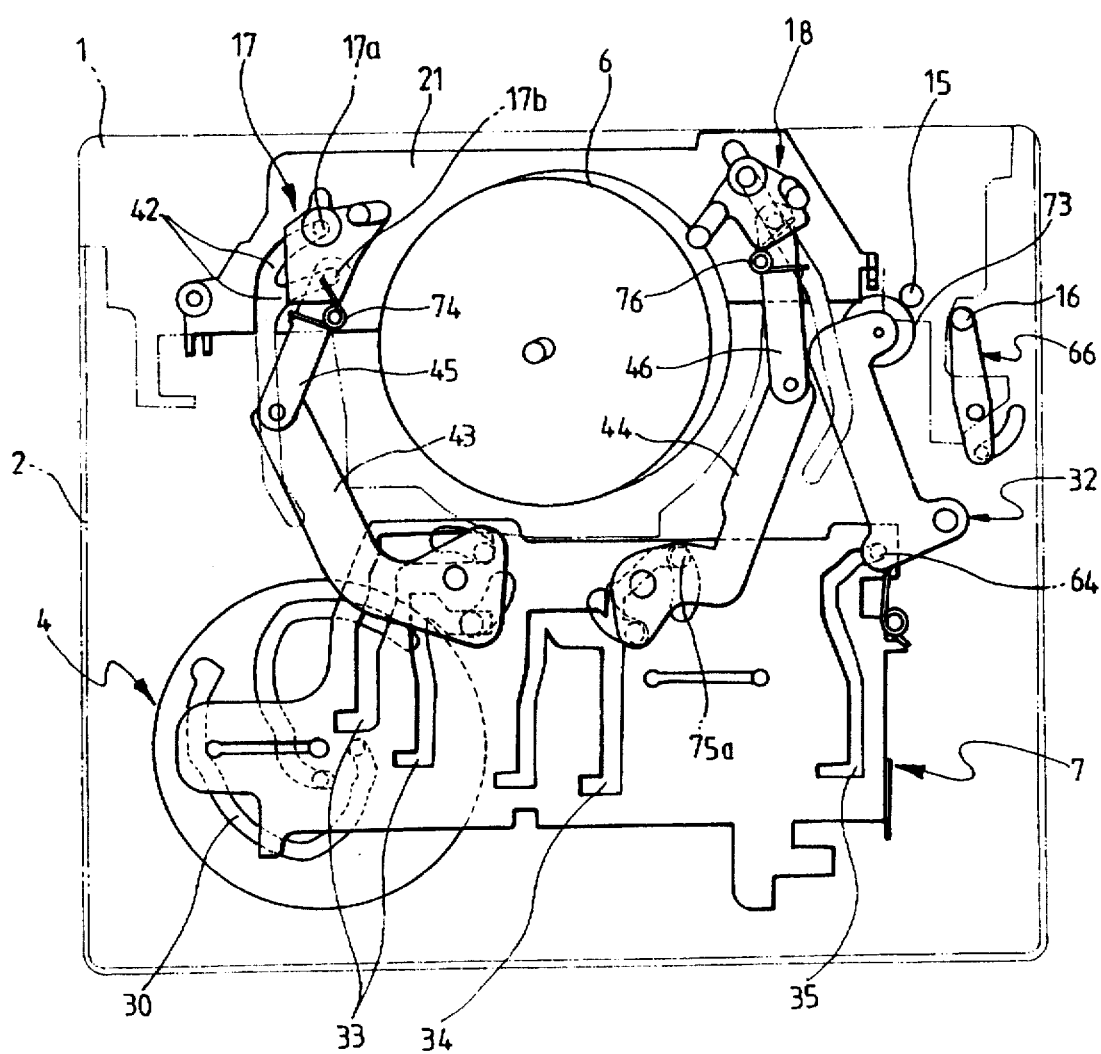
FIGS. 9A and 9B are schematic views showing a play mode of the mechanism of the present invention.
Figure 9:
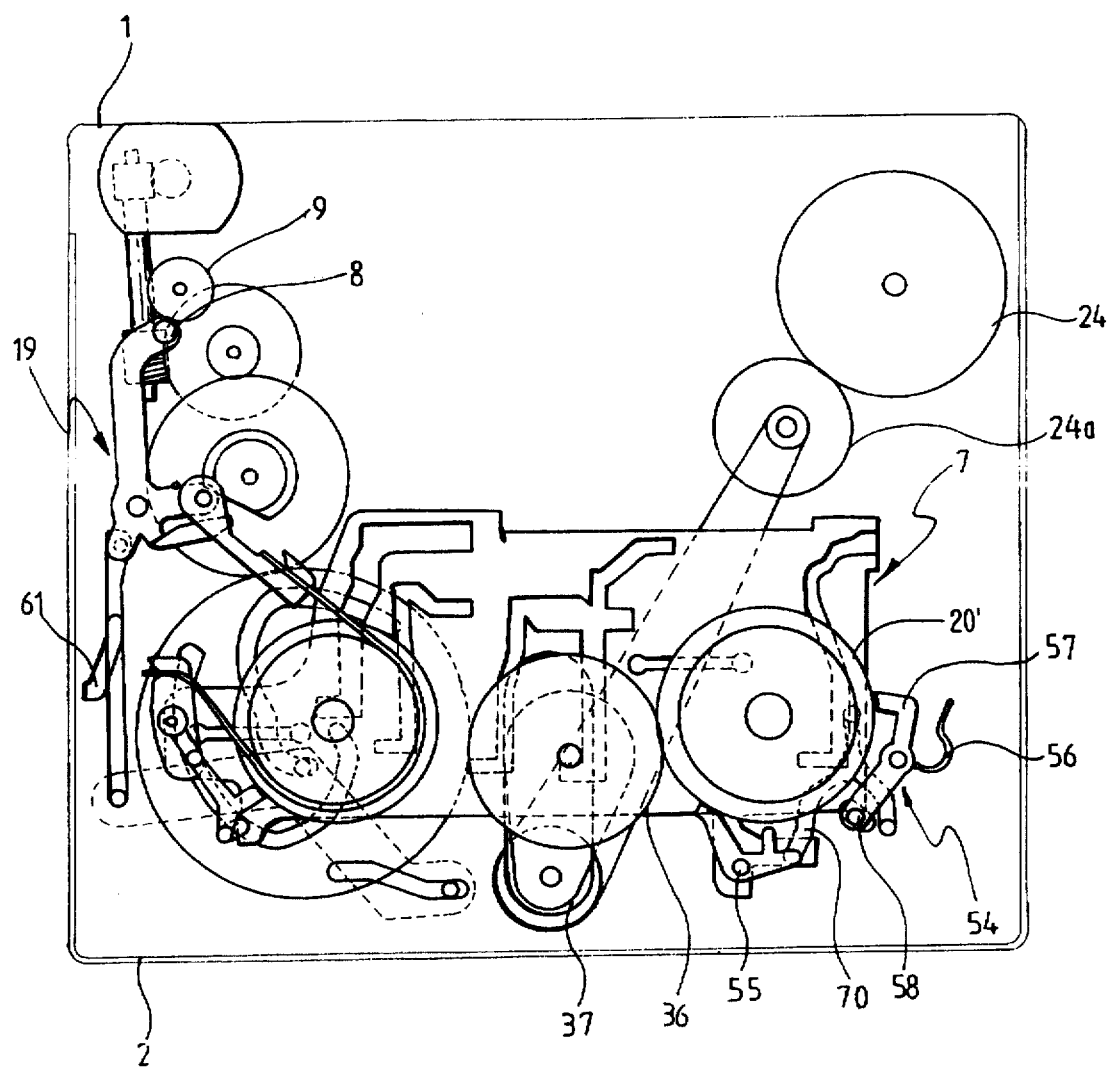

As shown in FIG. 9A, two guide protrusions 17a and 17b, which are coupled to upper and lower loading grooves 22a, 23a, 22b and 23b, are formed in a bottom surface of the left pole base 17. In addition, branch grooves 42 to which guide protrusions 17a and 17b are guided are formed in the left upper loading groove 22a. A protrusion 41 is formed in an entrance of branch groove 42 (see FIG. 3). Accordingly, the left pole base 17 can be further rotated clockwise, centering around protrusion 41.

Meanwhile, moving means for moving the sub-deck 2, and operating means for operating the brake members 47, 54 and 55, and moving the pinch roller 73 and the pole bases 17 and 18 operate as follows.

Referring to FIG. 2 to FIG. 4, driving motor 3 is installed on the main deck 1. In addition, a decelerating gear 25 which is rotated by driving motor 3, a first gear 26, a second gear 27 and a cam gear 4 are connected in series. Second gear 27 is provided with a mode switch (not shown) for controlling the driving motor 3 for each mode. First and second cam grooves 29 and 30 having predetermined shapes are formed in the cam gear 4. A cam lever 5 whose one end is pivotally coupled to the main deck 1, whose other end is slidably coupled to the sub-deck 2, and whose middle portion is slidably coupled to a first cam groove 29, is installed at an upper portion of the cam gear 4. A protrusion 5a coupled to the first cam groove 29 is formed on cam lever 5. In addition, protrusions 5b and 5c are formed on both ends of the cam lever 5. Guide grooves 5d and 5e, to which protrusions 5c and 5b are coupled, are formed in the sub-deck 2. A bush 5f is formed on the one end of the cam lever 5, and a post 1a is formed on the main deck (see FIG. 11). The bush 5f of the cam lever 5 is pivotally mounted on the post 1a so that the cam lever 5 can pivot with respect to the post 1a. Accordingly, as the cam gear 4 rotates, cam lever 5 follows along the first cam groove 29, while pivoting with respect to the post 1a, to thereby move the sub-deck 2 up and down.

A slide member 7 where a coupling pin 7a slidably coupled to second cam groove 30 is formed is provided between the main deck 1 and sub-deck 2. Guide slots 7b and 7c are formed in slide member 7, and protrusions 31 and 31a which are coupled to guide slots 7b and 7c are formed on main deck 1. Accordingly, the slide member 7 is guided right and left.

Third and fourth cam grooves 33 and 34 to which guide pins 75 and 75a of loading arms 43 and 44 are slidably coupled and a fifth cam groove 35 to which a guide pin 64 of pinch roller lever 32 is slidably coupled are formed in the slide member 7. Third and fourth cam grooves 33 and 34 respectively comprise first and second horizontal portions 90 & 91 and 96 & 97 to which the guide pins 75 and 75a are horizontally guided and vertical portions 92 and 93 to which guide pins 75 and 75a are vertically guided. In addition, inclined portions 94 and 95 having a predetermined inclination angle are provided between vertical portions 92 and 93 of the third and fourth cam grooves 33 and 34 and the second horizontal portions 96 and 97. In addition, fifth cam groove 35 includes a horizontal portion 98 to which the guide pin 64 of the pinch roller lever 32 is horizontally guided, a vertical portion 99 to which the guide pin 64 of the pinch roller lever 32 is vertically guided, and first and second inclined portions 100' and 101' which are inclined oppositely with respect to each other.

A brake lever 70 for interlocking the weak brake 55 with the main brake 54 is rotatably installed at a bottom surface of sub-deck 2. Brake lever 70 is divided into two parts, and each end portion contacts protrusions 55a and 58 of brakes 55 and 54, respectively. Protrusions 70a and 70b are formed in end portions of the brake lever 70. In addition, an eject lever 80 for releasing the locking of a housing (not shown) for receiving tape cassette 100 is rotatably installed at a bottom surface of sub-deck 2, centering around rotation axis 81. A protrusion 82 protruded downward is formed in an end portion of eject lever 80.

In an edge of slide member 7, a contacting portion 53 contacting protrusion 51 of sub-brake 47, contacting portions 53a and 53b contacting respectively protrusions 70a and 70b of brake lever 70 and a contacting portion 53c contacting protrusion 82 of eject lever 80 are protrudently formed.

Figure 7:
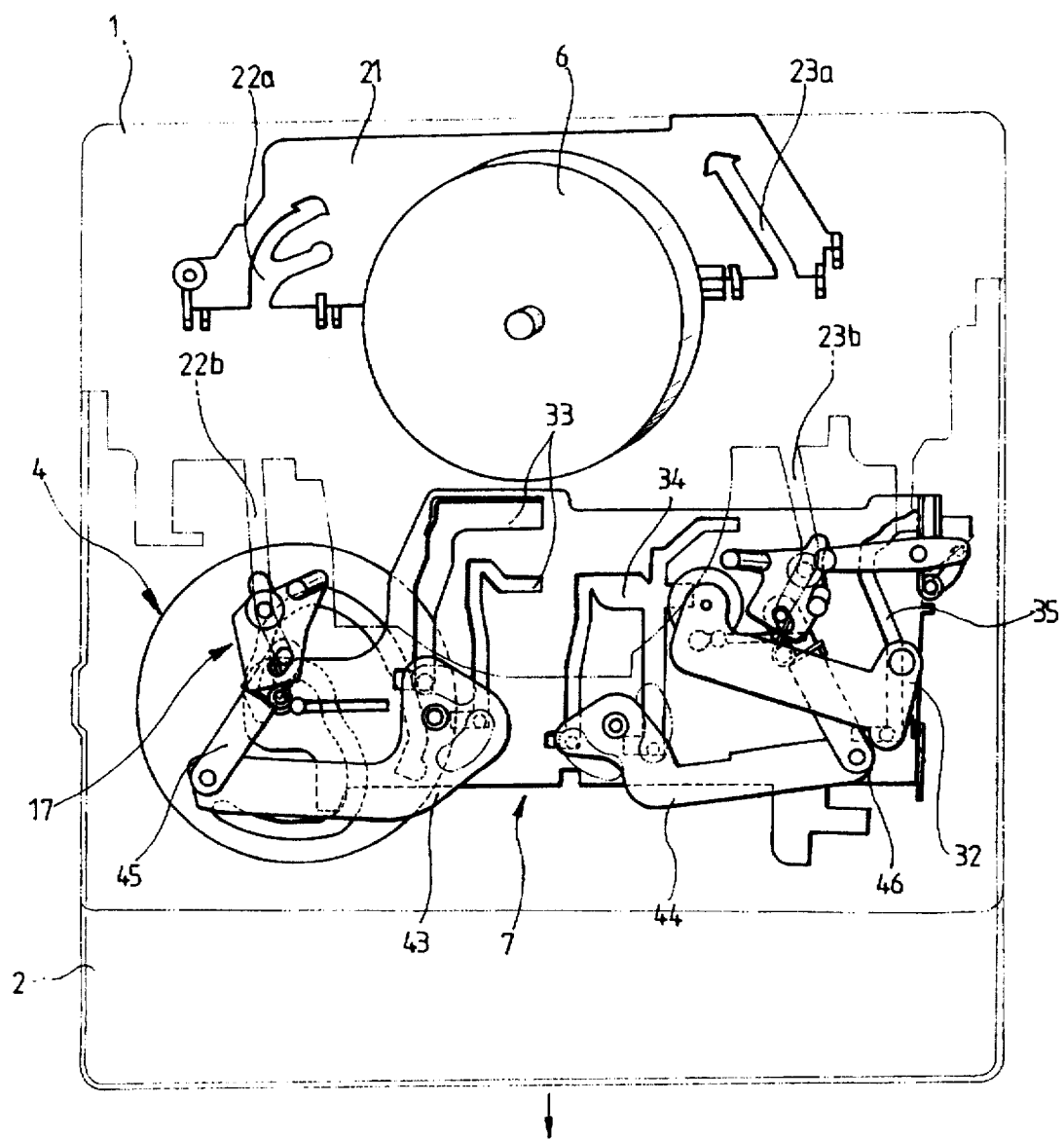
FIGS. 7A and 7B are schematic views showing an eject mode of the mechanism of the present invention.
Figure 7:
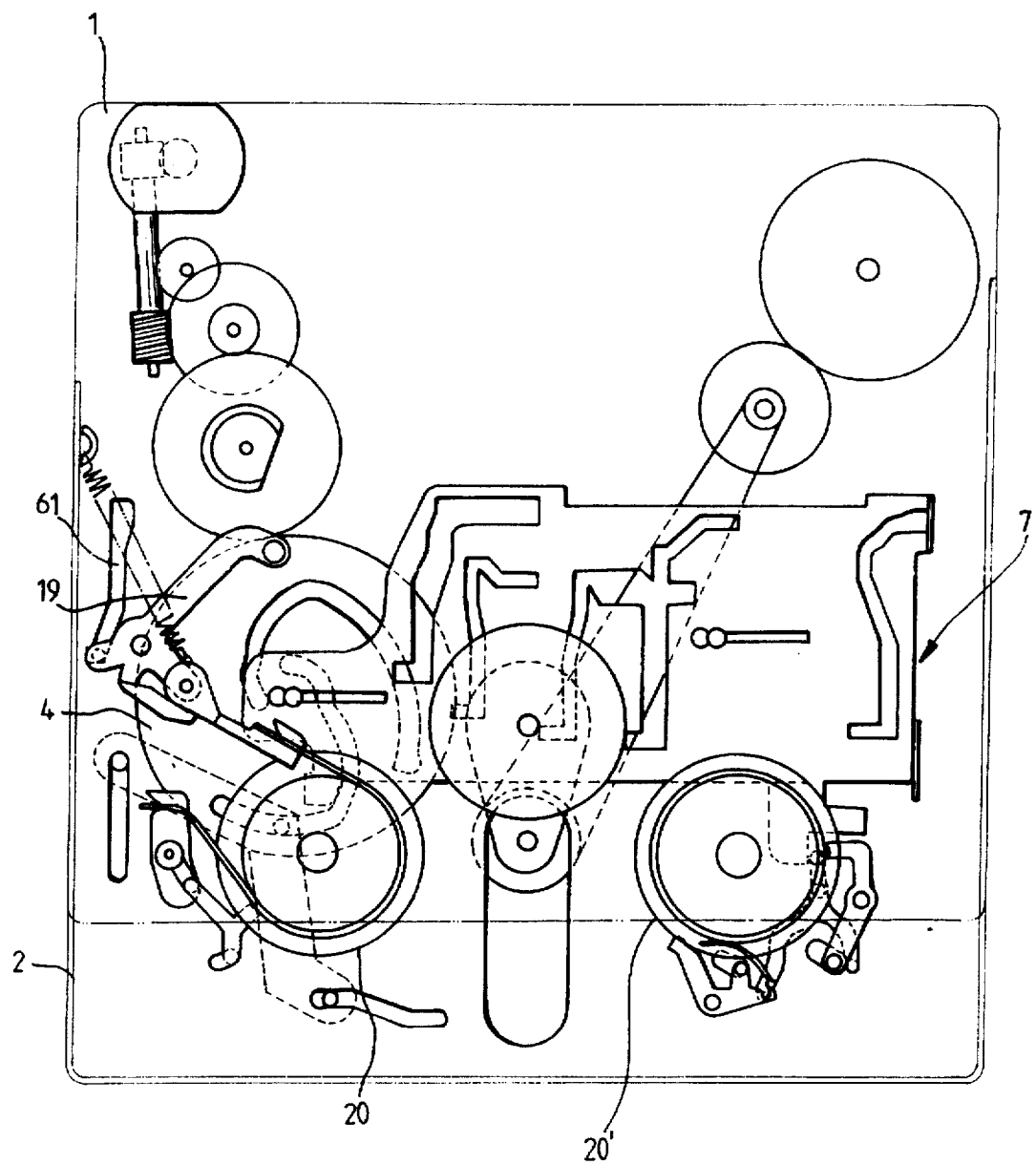
Figure 8:
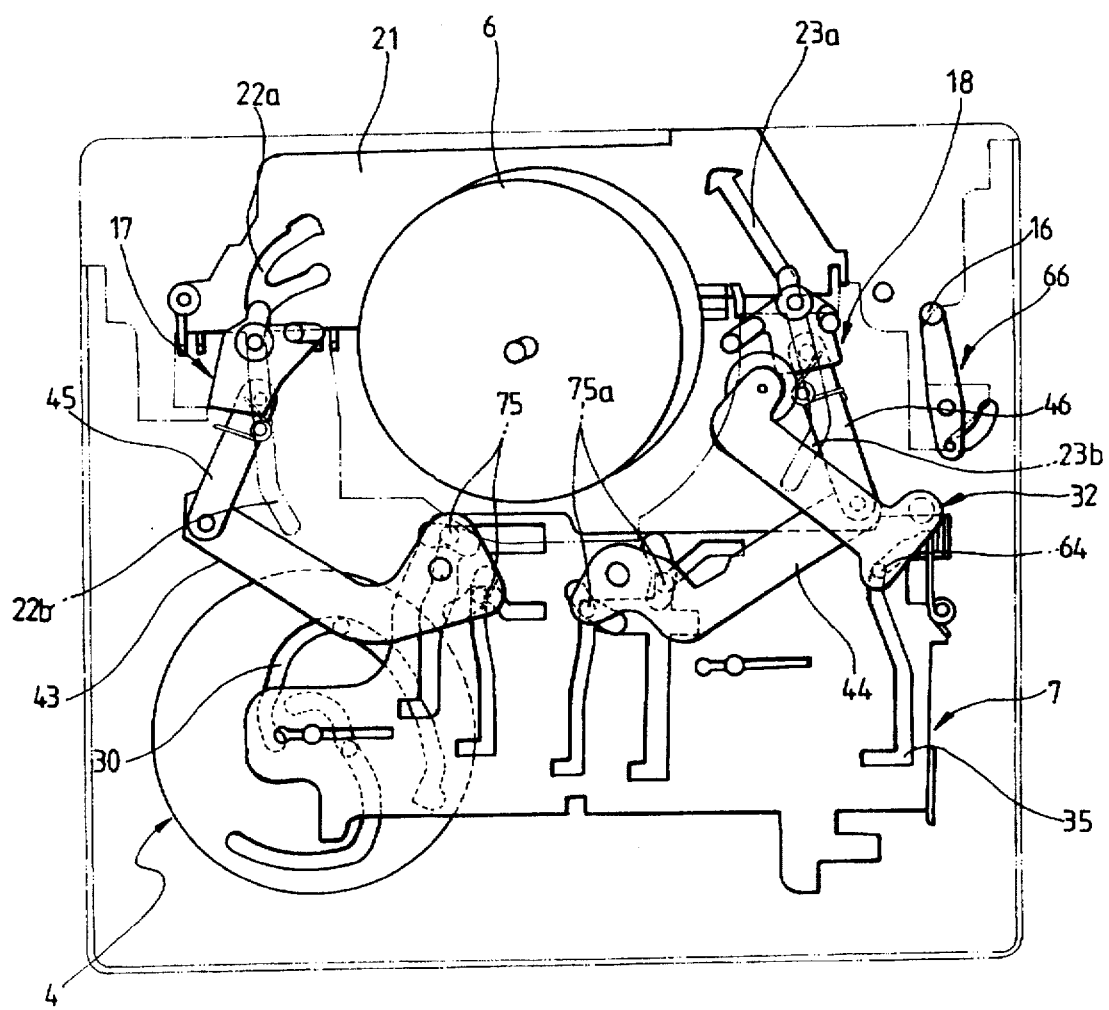
FIGS. 8A and 8B are schematic views showing a sub-loading mode of the mechanism of the present invention.
Figure 8:
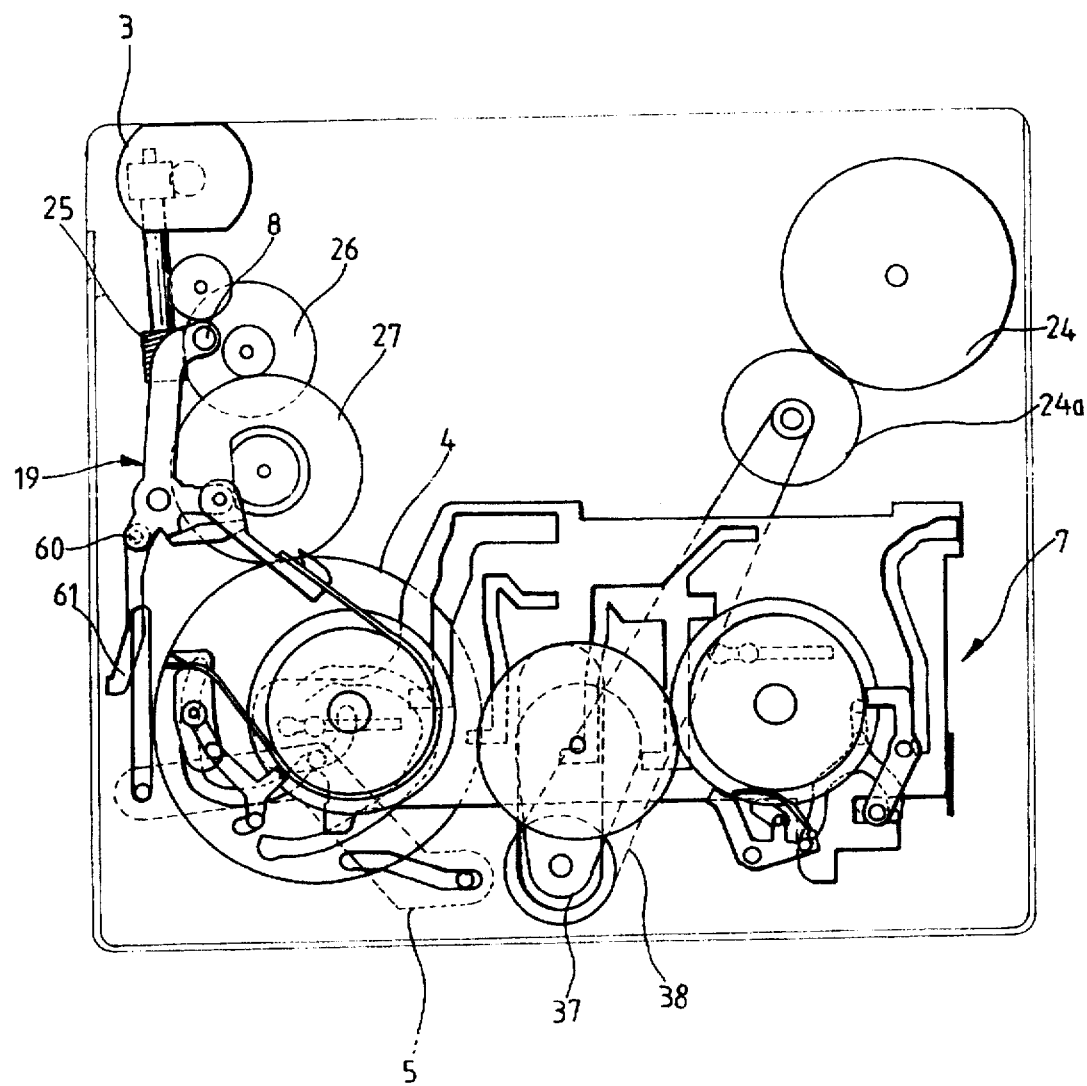

Meanwhile, as shown in FIGS. 3, 7A and 9B, a capstan gear 24a rotated by capstan motor 24, and a pulley 37 connected to capstan gear 24a by a belt 38 so as to be rotated, are installed on the main deck 1. Lever 37a is fixed onto pulley 37 and an idler gear 36 is rotatably installed on an end of the lever 37a. Idler gear 36 is selectively meshed with supply reel table 20 or take-up reel table 20' according to the rotation direction of pulley 37.

The reference numeral 68 of FIG. 2 and FIG. 4 is an end sensor for sensing a non-magnetic surface of a tape.

The deck mechanism of the above-described magnetic recording/reproducing apparatus of the present invention operates as follows.

Figure 6:
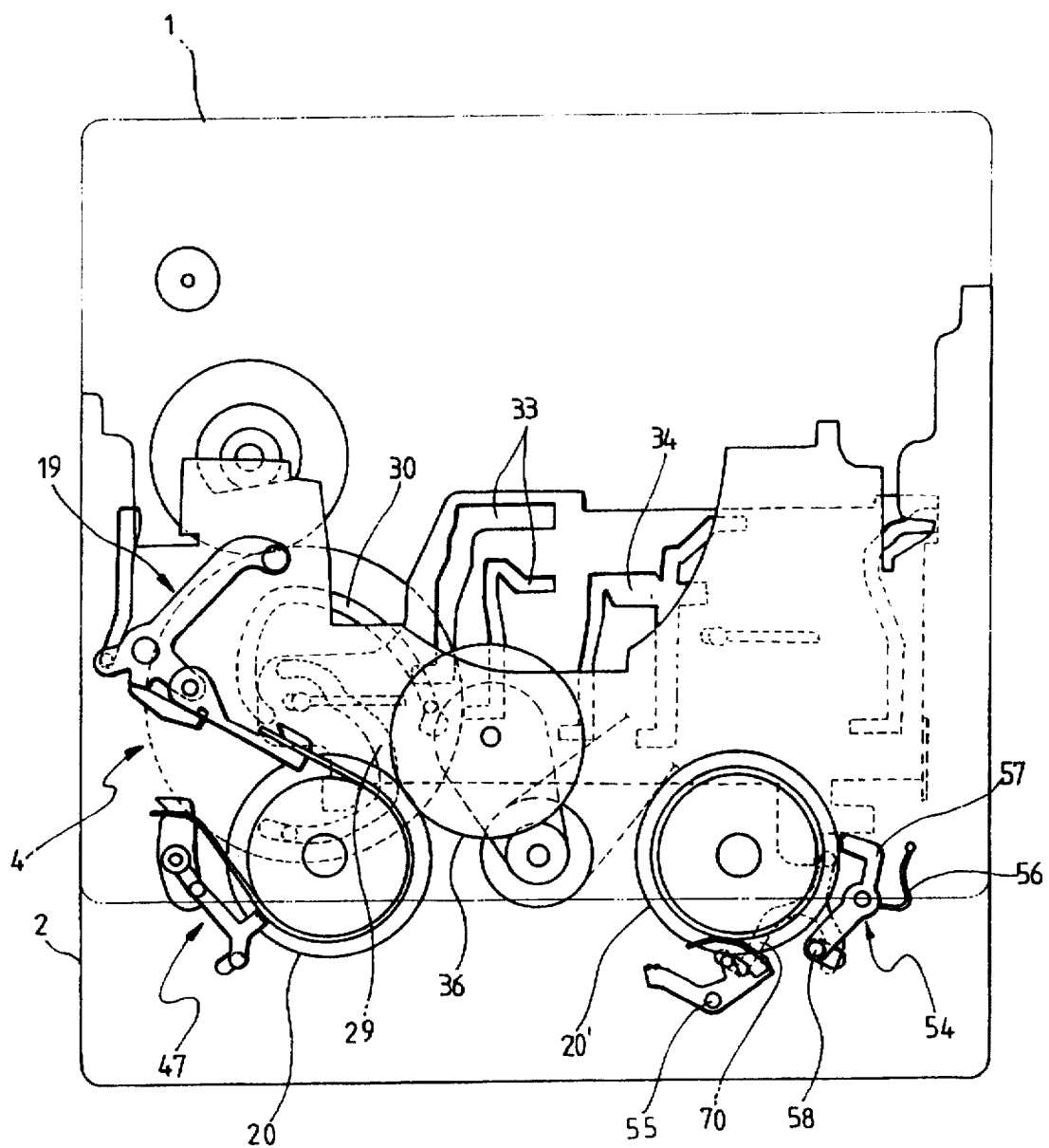
FIG. 6 is a plan view showing an end sensor mode of the mechanism of the present invention.
Figure 10:
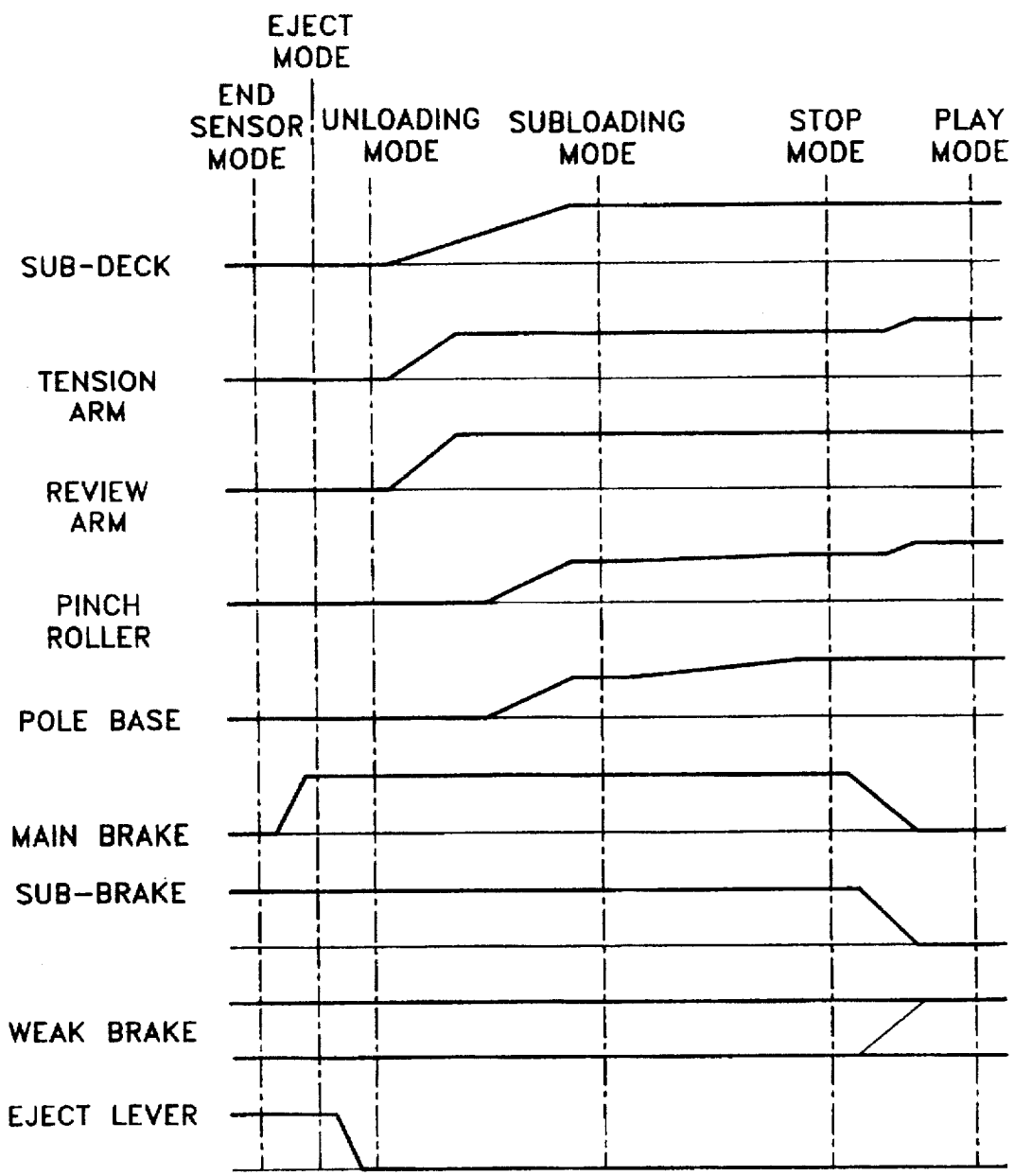
FIG. 10 schematically illustrates component modes according to the mechanism of the present invention.
Figure 11:
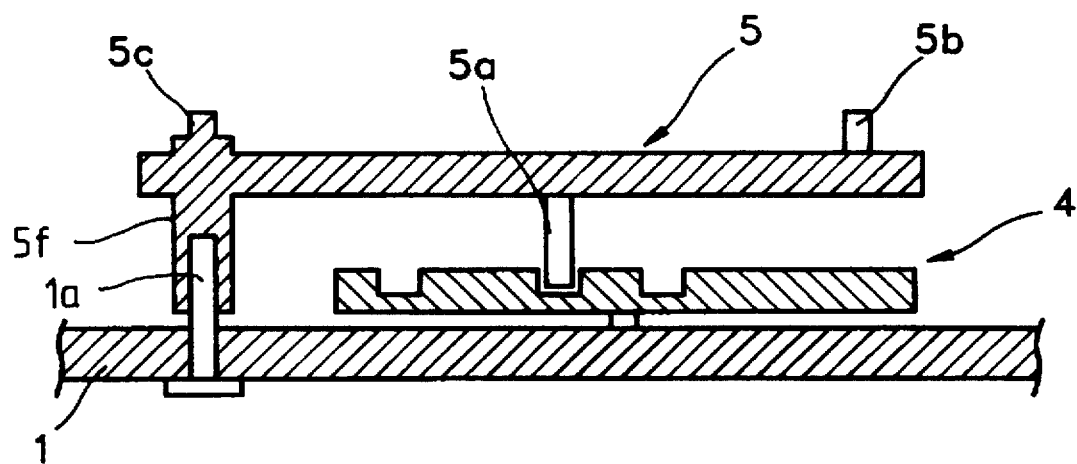
FIG. 11 is a sectional elevation of the cam lever, cam gear and main deck.

Referring to FIGS. 3, 6 and 10, an end sensor mode functions to slightly wind a tape onto a supply reel so that the tape can be smoothly drawn out from the tape cassette 100. First, tape cassette 100 where the tape is completely wound onto the supply reel is received into a housing (not shown). The housing is loaded by a loading apparatus which is not shown, and the tape cassette 100 is loaded onto reel tables 20 and 20'. Here, end sensor 68 senses a non-magnetic surface of the tape. When driving motor 3 drives, decelerating gear 25, first and second gears 26 and 27 and cam gear 4 rotate. Then, the cam gear 4 rotates counterclockwise to move slide member 7 to the left. At this time, contacting portion 53a of slide member 7 rotates a brake 70 which then rotates the weak brake 55 and the main brake 54. Here, the braking of take-up reel table 20' is released. When the capstan motor 24 operates, idler gear 36 contacts supply reel table 20. At this time, supply reel table 20 rotates counterclockwise, and the tape wound onto the take-up reel is partially wound onto the supply reel. Thus, the end sensor mode slightly rewinds the tape so that the tape can be drawn out from the tape cassette by tension pole 8, pole bases 17 and 18 and review pole 16.

An unloading mode immediately precedes a loading of the tape when the tape cassette 100 is loaded onto reel tables 20 and 20' as shown in FIG. 7A.

Referring to FIGS. 2, 5, 8A, 8B and 10, when the loading motor 3 operates after the end sensor mode operation is performed, decelerating gear 25, first and second gears 26 and 27 and cam gear 4 all rotate. At this time, slide member 7 moves slightly to the right and guide pins 75 and 75a of loading arms 43 and 44 are guided to first horizontal portions 90 and 91 of third and fourth cam grooves 33 and 34. At this time, cam lever 5 interlocked with the first cam groove 29 simultaneously rotates counterclockwise to transmit sub-deck 2 toward head drum 6. Here, guide pins 75 and 75a of loading arms 43 and 44 are guided to vertical portions 92 and 93 of third and fourth cam grooves 33 and 34. Accordingly, pole bases 17 and 18 move along lower loading grooves 22b and 23b by loading arms 43 and 44 and connecting levers 45 and 46. When a loading of sub-deck 2 is completed by rotation of cam lever 5, the lower loading groove 23b of the sub-deck 2 and the upper loading grooves 22a and 23a of main deck 1 are interconnected.

Here, when the pole bases 17 and 18 enter the upper loading grooves 22a and 23a, the slide member 7 moves slightly to the left by the rotation of cam gear 4. At this time, guide pin 75 of left loading arm 43 passes through inclined portion 94 of third cam groove 33, and left pole base 17 enters upper loading groove 22a. Then, pole base 17 slightly rotates clockwise by the resilience of resilient member 74, to thereby complete a loading operation. In addition, right pole base 18 enters upper loading groove 23a when guide pin 75a of loading arm 44 passes through inclined portion 95 of fourth cam groove 34. In addition, pole base 18 completes the loading by the resilience of resilient member 76.

Meanwhile, during sub-deck 2's movement upward by the rotation of cam lever 5, tension arm 19 rotates counterclockwise as guide pin 60 thereof is guided to first guide groove 61 formed in main deck 1. In addition, review arm 66 rotates clockwise as guide pin 67 is guided to second guide groove 65 formed in the main deck 1. Tension pole 8 and review pole 16 which rotates along with the movement of sub-deck 2, draw out the tape from the tape cassette 100. At the same time, a plurality of guiding elements installed in pole bases 17 and 18 which are transferred draw out the tape from tape cassette 100 in a similar way. The plural guiding elements comprise first guide roller 10, first inclined pole 11, second guide roller 13, second inclined pole 12 and third inclined pole 14.

In the meantime, simultaneously with a transfer of the sub-deck 2, guide pin 64 of pinch roller lever 32 rotates counterclockwise while being guided to a vertical portion 99 of fifth cam groove 35. When guide pin 64 is placed at the upper end of first inclined portion 100' of fifth cam groove 35, slide member 7 moves slightly to the left by a rotation of cam gear 4. At this time, guide pin 64 is guided to second inclined portion 101' so as to rotate the pinch roller lever 32. Accordingly, as shown in FIG. 2, the pinch roller 73 is pressed onto the capstan motor shaft 15.

A stop mode is a state where pinch roller 73 and capstan motor shaft 15 are slightly separated after the loading of the pole bases 17 and 18 is completed, reel tables 20 and 20' are braked by sub-brake 47, weak brake 55 and main brake 54, and tension pole 8 loosely contacts the tape. This state is obtained when slide member 7 slightly moves to the right by a rotation of cam gear 4. Here, guide pin 64 of pinch roller lever 32 contacts a second inclined portion 101' of fifth cam groove 35, to thereby rotate the pinch roller lever 32 counterclockwise. In addition, tension arm 19 rotates clockwise to cam 62 of second gear 27 that rotates together with cam gear 4. As slide member 7 moves to the right, contacting portions 53, 53a, 53b and 53c are each separated from brakes 47, 55 and 54.

Referring to FIGS. 5, 9A and 9B, the head drum 6 rotates and capstan motor 24 is simultaneously driven after the sub-loading mode is performed. As idler gear 36 is meshed with take-up reel table 20' which is then rotated clockwise. At this time, a tape is wound to the take-up reel by a pressure between capstan motor shaft 15 and pinch roller 73. In the meantime, slide member 7 moves slightly to the left by a rotation of cam gear 4. Here, sub-brake 47 is separated from supply reel table 20, and main brake 54 is separated from take-up reel table 20'. However, weak brake 55 contacts an outer circumferential surface of take-up reel table 20'. Thus, the tape is wound onto the take-up reel via the supply reel and head drum 6 and reproduced.

As shown in FIG. 7A and FIG. 7B, the sub-deck 2 is transmitted downward by cam lever 5 when cam gear 4 rotates in the reverse direction. Here, the upper and lower loading grooves 22a, 23a, 22b and 23b are separated, and pole bases 17 and 18 are guided to third and fourth cam grooves 33 and 34 of slide member 7 to move along lower loading grooves 22b and 23b. When sub-deck 2 is fully in its downward position, protrusion 82 of eject lever 80 contacts contacting portion 53c, as eject lever 80 rotates. Here, eject lever 80 releases the locking of a housing (not shown).

The deck mechanism of a magnetic recording/reproducing apparatus of the present invention has certain distinct advantages. First, pole bases 17 and 18, a plurality of brakes 47, 54 and 55, and a pinch roller 73 are operated by a single slide member 7, to thereby simplify an apparatus structure. Second, a head drum is installed to be inclined toward the third quadrant, to thereby shorten a loading distance of a tape cassette.

Also, the magnetic recording/reproducing apparatus having such advantages enables the manufacture of a miniaturized and lightweight product.

It is contemplated that numerous modifications may be made to the deck mechanism of the present invention without departing from the spirit and scope of the invention as defined in the following claims.

What is claimed is:

1. A deck mechanism of a magnetic recording/reproducing apparatus, comprising:

a main deck having installed thereon a capstan motor, and a head drum with a magnetic head;

a sub-deck, which is slidably installed on an upper portion of said main deck, having installed thereon a supply reel table and a take-up reel table where a tape cassette is loaded, a brake member for braking at least one of said supply and take-up reel tables, a pair of pole bases for drawing out a tape from the tape cassette and transmitting the tape toward said head drum, a connecting lever and a loading arm connected to each of said pole bases and rotatably mounted, a pinch roller pressed onto a shaft of said capstan motor so as to press and transmit the tape, and a rotatable for supporting said pinch roller;

moving means for moving said sub-deck with respect to said main deck; and operating means for integrally operating said brake member, said pinch roller and said pole bases, said operating means including a slide member disposed between said main deck and said sub-deck and which selectively operates said brake member, said pinch roller and said pole bases when said moving means moves said sub-deck.

2. A deck mechanism of a magnetic recording/reproducing apparatus according to claim 1, wherein said moving means comprises:

a driving motor installed on said main deck and producing a driving force;

a cam gear rotated by the driving force of said driving motor and in which a first cam groove having a predetermined shape is formed; and a lever member having ends which are slidably coupled to said main deck and said sub-deck, respectively, and an intermediate portion which is coupled to said first cam groove.

3. A deck mechanism of a magnetic recording/reproducing apparatus according to claim 1, wherein said operating means further comprises:

a driving motor installed on said main deck and producing a driving force; and a cam gear rotated by the driving force of said driving motor and in which a second cam groove is formed; and wherein said slide member includes a coupling pin which is slidably coupled to said second cam groove, third and fourth cam grooves to which part of said pair of loading arms is slidably coupled, a fifth cam groove to which said rotatable lever supporting said pinch roller is slidably coupled, and a plurality of contacting portions partially contacting said brake member, whereby said pole bases, said brake member and said pinch roller selectively operate when said sub-deck moves.

4. A deck mechanism of a magnetic recording/reproducing apparatus according to claim 3, wherein said pair of loading arms comprises guide pins coupled to said third and fourth cam grooves, and said third and fourth cam grooves each includes first and second horizontal portions to which said guide pins are guided horizontally and a vertical portion for connecting said first and second horizontal portions and to which said guide pins are guided vertically.

5. A deck mechanism of a magnetic recording/reproducing apparatus according to claim 1, further comprising upper and lower loading grooves for guiding a movement of said pole bases and which are separately formed in said main deck and said sub-deck, respectively.

6. A deck mechanism of a magnetic recording/ reproducing apparatus according to claim 5, further comprising a pair of guide protrusions coupled to said loading grooves and which are formed at a bottom surface of said pole bases, and said upper loading groove comprises branch grooves to which said pair of guide protrusions are respectively guided.

7. A deck mechanism of a magnetic recording/ reproducing apparatus according to claim 1, wherein said head drum is inclined toward a third quadrant of said head drum.

8. A deck mechanism of a magnetic recording/ reproducing apparatus according to claim 1, further comprising a tension pole for tensioning the tape and which is installed on the sub-deck adjacent to said supply reel table, a tension arm for supporting said tension pole, and tension arm operating means for operating said tension arm.

9. A deck mechanism of a magnetic recording/ reproducing apparatus according to claim 8, wherein said tension arm operating means is constituted by a first guide groove formed in said main deck and a guide pin provided on said tension arm and coupled to said first guide groove, and operative such that said tension arm rotates by moving said guide pin along said first guide groove when said sub-deck moves up and down.

10. A deck mechanism of a magnetic recording/ reproducing apparatus according to claim 1, further comprising a review pole installed on said sub-deck adjacent to said take-up reel table and for tensioning the tape, a review arm for supporting said review pole, and review arm operating means for operating said review arm.

11. A deck mechanism of a magnetic recording/ reproducing apparatus according to claim 10, wherein said review arm operating means is constituted by a second guide groove formed in said main deck and a guide pin provided on said review arms and coupled to said second guide groove, and operative such that said review arm rotates by moving said guide pin along with said second guide groove when said sub-deck moves up and down.

12. A deck mechanism of a magnetic recording/ reproducing apparatus, comprising:

a main deck having installed thereon a capstan motor, and a head drum with a magnetic head;

a sub-deck, which is slidably installed on an upper portion of said main deck, having installed thereon a supply reel table and a take-up reel table where a tape cassette is loaded, a brake member for braking at least one of said supply and take-up reel tables, a pair of pole bases for drawing out a tape from the tape cassette and transmitting the tape toward said head drum, a connecting lever and a loading arm connected to each of said pole bases and rotatably mounted, a pinch roller pressed onto a shaft of said capstan motor so as to press and transmit the tape, and a rotatable lever supporting said pinch roller;

moving means for moving said sub-deck with respect to said main deck; and a slide member disposed between said main deck and said sub-deck and which selectively operates said brake member, said pinch roller and said pole bases when said moving means moves said sub-deck.

* * * * *